(12) United States Patent
Barazani

(10) Patent No.: US 6,702,527 B2
(45) Date of Patent: Mar. 9, 2004

(54) CUTTING TOOL ASSEMBLY

(75) Inventor: Gideon Barazani, Kiriat Bialik (IL)

(73) Assignee: Iscar Ltd., Tefen (IL)

( * ) Notice: Subject to any disclaimer, the term of this patent is extended or adjusted under 35 U.S.C. 154(b) by 84 days.

(21) Appl. No.: 10/206,228

(22) Filed: Jul. 29, 2002

(65) Prior Publication Data

US 2002/0176754 A1 Nov. 28, 2002

Related U.S. Application Data

(63) Continuation-in-part of application No. PCT/IL01/00126, filed on Feb. 8, 2001.

(30) Foreign Application Priority Data

Mar. 13, 2000 (IL) .................................................. 135024

(51) Int. Cl.[7] .............................. B23C 5/20; B26D 1/14
(52) U.S. Cl. ............................................. 407/42; 407/50
(58) Field of Search ........................... 407/42, 50, 109, 407/110, 91, 66; 83/845

(56) References Cited

U.S. PATENT DOCUMENTS

| | | | |
|---|---|---|---|
| 4,363,576 A | 12/1982 | Zweekly | 407/50 |
| 4,558,974 A * | 12/1985 | Pano | 407/50 |
| 4,580,930 A | 4/1986 | Zinner | 407/110 |
| 4,604,004 A | 8/1986 | Armbrust | 407/110 |
| 4,938,640 A * | 7/1990 | Pano et al. | 407/110 |

OTHER PUBLICATIONS

International Search Report of PCT/IL00/00126 dated Feb. 8, 2001.
Written Opinion mailed Feb. 22, 2002 in PCT/IL00/0126.
Response to the Written Opinion mailed Jul. 3, 2002 in PCT/IL00/00126.
International Preliminary Examination Report in PCT IL00/00126 dated Jun. 13, 2002 with Examined Claims.

* cited by examiner

*Primary Examiner*—Willmon Fridie, Jr.
(74) *Attorney, Agent, or Firm*—Womble Carlyle

(57) ABSTRACT

A cutting tool assembly having a tool body portion and at least one cutting portion, the at least one cutting portion having a tool clamping portion, an insert retaining member, a precisely located cutting insert and a securing member for ensuring that precise location of the cutting insert is maintained. The tool clamping portion has a tool base jaw and a tool clamping jaw. A slot extends generally rearwardly from a gullet to provide limited flexibility to the tool clamping jaw.

17 Claims, 4 Drawing Sheets

CUTTING TOOL ASSEMBLY

RELATED APPLICATIONS

This is a Continuation-in-part of international application PCT/IL01/00126, filed Feb. 8, 2001, which published in English as WO 01/68298.

FIELD OF THE INVENTION

This invention relates to a cutting tool assembly having a resilient clamping mechanism and a replaceable insert retention member.

BACKGROUND OF THE INVENTION

Cutting tools employing a resilient clamping mechanism for clamping cutting inserts are generally of relatively narrow thickness. For example, cutting operations such as grooving and parting off can be performed by a cutting insert retained in an insert pocket located between the clamping surfaces of upper and lower jaws of a relatively narrow holder blade. The holder blade is, in turn, generally clamped in a blade-retaining block. The holder blade is generally provided with a suitably designed opening, in the vicinity of the insert pocket whereby a relatively narrow bridging portion is formed enabling a limited degree of resilient displacement of one of the holder blade's jaws relative to the other. Generally, the lower jaw is rigid and the upper jaw is resiliently displaceable. The opening can be of the form of an aperture, or a slot, or a slot terminating in an aperture. Examples of such cutting tools are disclosed in U.S. Pat. No. 3,785,021 and U.S. Pat. No. 4,580,930. A rotary slot-cutting tool employing a resilient insert clamping mechanism is disclosed in U.S. Pat. No. 5,059,068. The cutter body is disc-shaped and of relatively narrow thickness, with cutting insert pockets located around its periphery. As with the holder blade, an insert pocket of a rotary slot-cutting tool has two jaws between which an insert is clamped by means of the resilient force resulting from the bending of the clamping jaw.

Whether the cutting tool is a holder blade or a rotary slot cutting tool, the bending of the clamping jaw is obtained by manufacturing the insert pocket such that the distance between the clamping surfaces of the jaws is smaller than the height of the portion of the insert located between the clamping surfaces. Consequently, when an insert is located in the insert pocket, the clamping jaw is held in a bent position creating an elastic force by means of which the insert is clamped in position.

An example of a well-known problem with cutting tools of the type described above is that a forward region of the insert pocket can come into contact with the workpiece and consequently become damaged. This can be particularly problematic with rotary slot cutting tools, where the damaging of one or two insert pockets requires the replacing of the whole cutting tool. A solution to this problem is proposed in U.S. Pat. No. 4,604,004 in which there is disclosed a cutting tool assembly having a hard, wear resistant insert, a shim and a blade body. The shim has a recess that tapers towards its open end to springingly hold the insert. The blade body has a downwardly and rearwardly extending recess that tapers toward the blade body to wedgingly hold the shim and insert. Assembly of the cutting tool assembly is accomplished by first inserting the insert into the shim recess, after which the shim, with the insert mounted therein, is inserted into the blade body recess. As the cutting tool assembly is contacted with a workpiece, the insert and the shim are wedged further into the blade body recess, thereby increasing the positive retention of the insert and the shim. After a period of use, the insert and shim are removed from the body so that the insert can be replaced. The shim is removed from the blade body by inserting a screwdriver in a gap between the blade body and the shim and applying a prying action to the screwdriver. The insert is removed from the shim by inserting a screwdriver into a notch of the shim and then twisting the screwdriver.

A disadvantage of the cutting tool assembly disclosed in the '004 patent is that after assembling the cutting tool assembly, the cutting edge of the cutting insert is not precisely located. As pointed out in the '004 patent, the insert and the shim are further wedged into the blade body recess as the cutting tool assembly is contacted with a workpiece. This situation is particularly disadvantageous for rotary slot cutting tools where there are a plurality of cutting inserts spaced about the periphery of the tool and imprecise location of the cutting edges of the cutting inserts results in inefficient cutting operations in which some of the inserts participate more in the cutting operation than others.

In the '004 patent the member in which the cutting insert is mounted is referred to as a "shim". In the following description and claims the member in which the cutting insert is mounted will be referred to as an "insert retention member".

A further disadvantage of the cutting tool assembly disclosed in the '004 patent is that, the shim is not secured to the blade body. This can be especially problematic if the shim is used in a rotary slot-cutting tool, since there is nothing to prevent the shim from becoming displaced during a slotting operation. U.S. patent application Ser. No. 09/458, 675, filed Dec. 10, 1999, provides a cutting tool assembly having a replaceable insert retention member with a resilient clamping mechanism that overcomes the above mentioned disadvantages.

However, the prior art does not provide means for ensuring that a cutting insert cannot become completely dislodged and even fly out of the insert pocket under the influence of centrifugal forces. A situation that can be particularly dangerous when operating at high speeds.

It is an object of the present invention to provide a cutting tool assembly having a replaceable insert retention member with a resilient clamping mechanism that is designed to ensure that a cutting insert is securely retained by the insert retention member in such a way that it cannot become completely dislodged and possibly fly out of the insert pocket under the influence of centrifugal forces.

SUMMARY OF THE INVENTION

The present invention is directed to a cutting tool assembly, comprising a tool body portion and at least one cutting portion at a forward portion of the cutting tool assembly, the at least one cutting portion comprising a tool clamping portion, and an insert retaining member. The insert retaining member is configured to retain a cutting insert, when such cutting insert is present.

The tool clamping portion comprises a tool base jaw having an upper side constituting a first clamping surface; a tool clamping jaw having an upper side and a lower side, the lower side constituting a second clamping surface, the tool base jaw and the tool clamping jaw having a gap therebetween for resiliently receiving the insert retaining member, the gap having a given rearward linear extent (L3); a first slot extending in a generally rearward direction from a rear section of the gap, the first slot terminating in an aperture, the gap together with the first slot and the aperture forming an insert retaining member pocket having a given rearward linear extent (L2); a forwardly facing first location surface; and a second slot extending generally rearwardly from a gullet bordering the upper side of the tool clamping jaw, the second slot having a given rearward linear extent (L1).

The insert retaining member comprises a base jaw having a lower side constituting a first clamping abutment surface for abutting the first clamping surface, and a clamping jaw having an upper side constituting a second clamping abutment surface for abutting the second clamping surface, the base jaw and the clamping jaw defining therebetween an insert pocket for receiving a cutting insert; and a rearwardly facing second location surface wherein, when the cutting tool assembly is assembled, the second location surface of the insert retaining member abuts the first location surface thereby precisely locating the insert locating member in the gap.

In one aspect of the invention, the rearward linear extent (L1) of the second slot may be much less than the rearward linear extent (L2) of the insert retaining member pocket (L1<<L2).

In another aspect of the invention, the rearward linear extent (L1) of the second slot, may be less than the rearward linear extent (L3) of the gap (L1<L3).

In yet another aspect of the invention, the first location surface may be located at a rear section of the gap adjacent the first slot and oriented substantially perpendicular to the first and second clamping surfaces. Furthermore, the second location surface may be located to the rear of the base jaw of the insert retaining member. The insert retaining portion may further comprise a securing portion to which a securing member can be removably attached for securing the insert retaining member in position in the gap between the tool clamping jaw and the tool base jaw of the tool clamping portion. Additionally, the securing portion may be an elongated portion of the insert retaining member extending in a generally rearward direction and capable of passing through the first slot. The securing member may be of a general trapezoidal shape, having a forward face and a rear face, and wherein when the insert retaining member is retained in the gap in the tool clamping portion, the securing member is received in a recessed region in the elongated portion of the insert retaining member, the recessed region having a shape generally similar to that of the securing member, the aperture has two rearwardly facing spaced apart abutment surfaces adjacent the first slot and the elongated portion of the insert retaining member has a forwardly facing rear abutment surface, the securing member being provided with a countersunk through bore with a first longitudinal axis and the recessed region being provided with a screw threaded bore having a second longitudinal axis, the first and second longitudinal axes being relatively displaced one with respect to the other in a manner so that when a countersunk head screw is placed in the countersunk through bore and is screwed into the screw threaded bore the forward face of the securing member abuts the two rearwardly facing spaced apart abutment surfaces and the rear face of the securing member abuts the forwardly facing rear abutment surface of the elongated portion, thereby ensuring that precise location of the insert retaining member is maintained.

In yet another aspect of the invention, the upper side of the tool base jaw of the tool clamping portion may be substantially parallel to the lower side of the tool clamping jaw of the tool clamping portion. Furthermore, the first and second clamping abutment surfaces may taper towards the rear of the insert retaining member forming therebetween a taper angle ($\alpha$). The taper angle ($\alpha$) may be approximately 2°.

In another aspect of the invention, the base jaw and the clamping jaw of the insert retaining member have, respectively, first and second insert abutment surfaces that taper towards a forward end of the insert retaining member at a given taper angle, and the cutting insert has an upper surface and a lower surface, the upper surface comprising two sections, a forward section and rear section, the forward section of the insert upper surface and the lower surface taper towards a forward end of the cutting insert with a taper angle substantially equal to the taper angle between the first and second insert abutment surfaces of the insert retaining member. The rear section, of the upper surface, and the lower surface may taper towards a rear end of the cutting insert.

In yet another aspect of the invention, the insert pocket may be provided with an aperture extending from a rear section of the insert pocket in a generally rearward direction.

Furthemore, the cutting tool assembly may be a rotary slot cutting tool in which the rearward linear extent of the gullet is much less than the rearward linear extent of the insert retaining member pocket.

BRIEF DESCRIPTION OF THE DRAWINGS

For a better understanding the invention will now be described, by way of example only, with reference to the accompanying drawings in which.

DETAILED DESCRIPTION OF THE INVENTION

Figure 1:
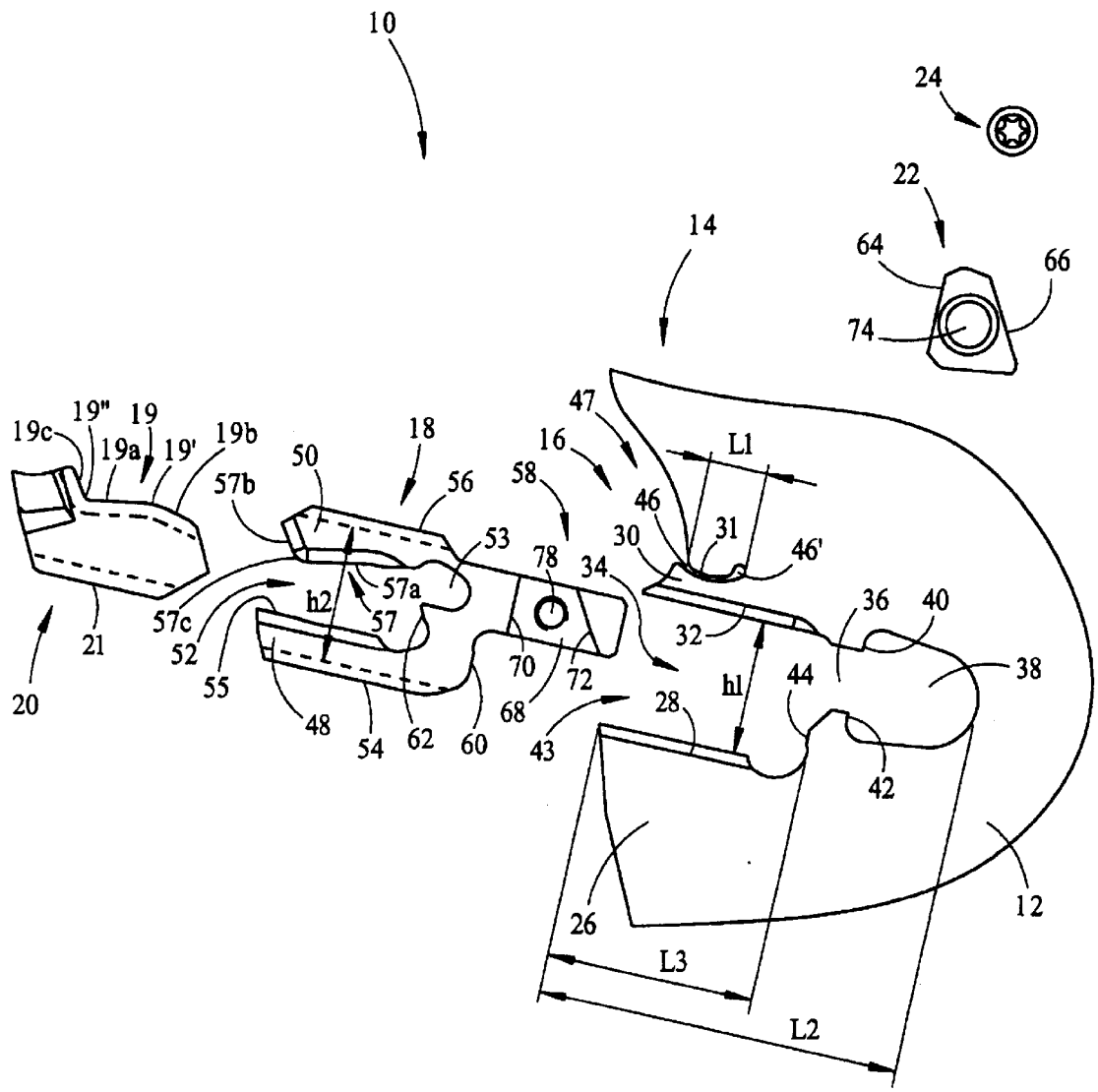
FIG. 1 is an exploded side view of a cutting portion of a cutting tool in accordance with the present invention, comprising a tool clamping portion, an insert retaining member, a cutting insert and a securing member.
Figure 2:
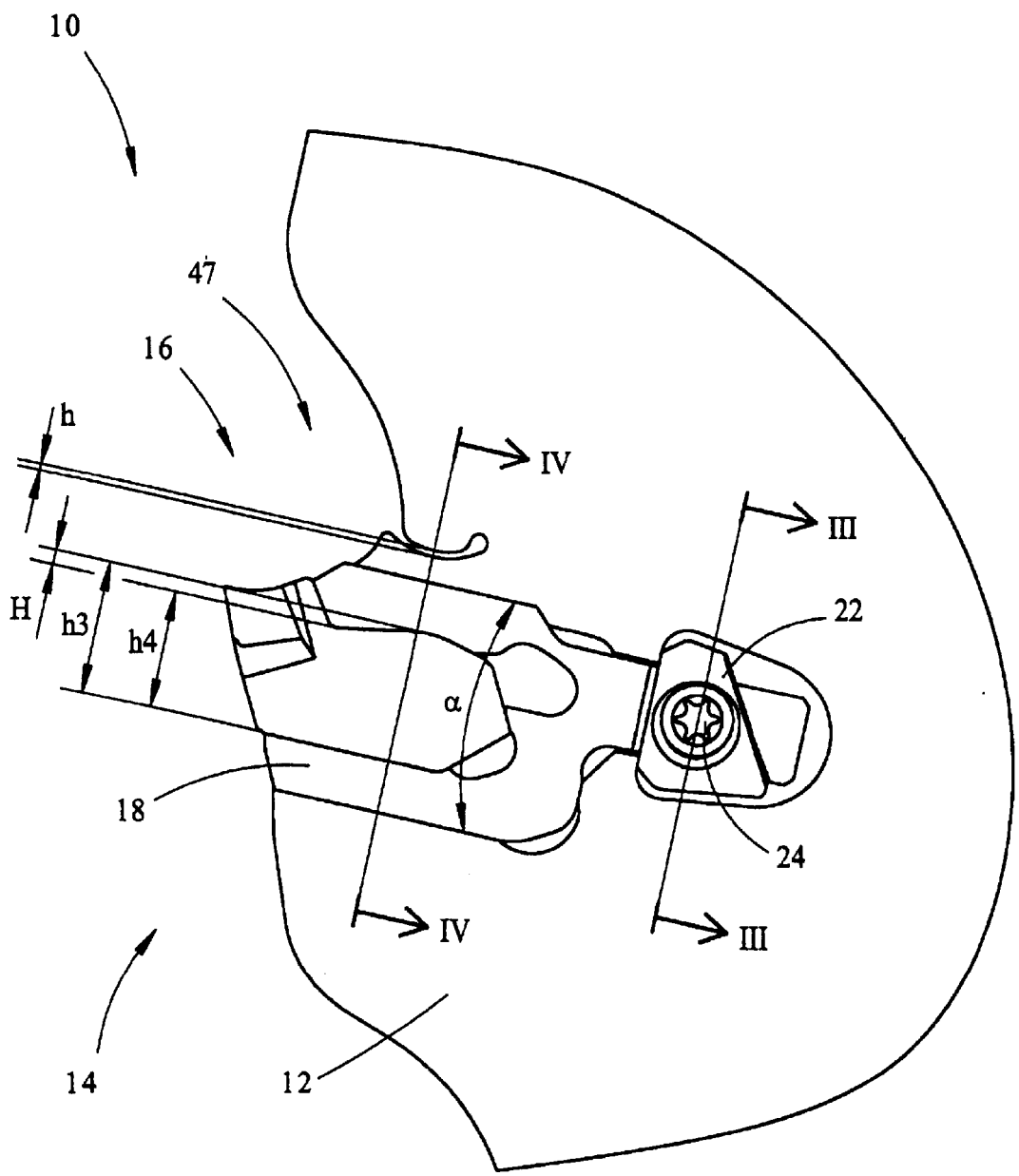
FIG. 2 is a side view of the cutting portion of FIG. 1, showing the insert retaining member mounted in the tool clamping portion thereof and secured in position by means of the securing member with the cutting insert mounted in the insert pocket.

Attention is first drawn to FIGS. 1 and 2. A cutting tool assembly 10 comprises a tool body portion 12 and a cutting portion 14. In the following description and claims the directional terms are in accordance with the orientation of the portion of the cutting tool assembly shown in FIGS. 1 and 2. Therefore, a portion of a member to the left in these figures will be referred to as a forward portion of the member, whereas a portion of a member to the right in the figures will be referred to as a rear portion of the member. Similarly, portions of a member to the top and bottom in these figures refer, respectively, to upper and lower portions of the member. The cutting portion 14 is a forward portion of the cutting tool assembly 10 comprising a tool clamping portion 16, an insert retaining member 18, a cutting insert 20 and a securing member 22. The securing member 22 is fastened to the insert-retaining member 18 by means of a countersunk head screw 24. The securing member 22 is for securing the insert retaining member 18 in position thereby ensuring that the precise location of the insert retaining member, and consequently of the cutting insert, is maintained throughout a cutting operation.

The tool clamping portion 16 comprises a tool base jaw 26 having an upper side 28, constituting a first clamping surface, and a tool clamping jaw 30 having an upper side 31 and a lower side 32. The lower side 32 constituting a second clamping surface. The tool base jaw 26 and the tool clamping jaw 30 having a gap 34 between them for resiliently receiving the insert retaining member 18. The first and second clamping surfaces constituting, respectively, lower and upper boundaries of the gap 34. The first and second clamping surfaces 28 and 32, respectively, are substantially parallel to each other and the distance between them is h1. An imaginary line parallel to the first and second clamping surfaces 28 and 32, respectively, and passing approximately midway between them, defines a longitudinal axis of the cutting portion 14 of the cutting tool assembly 10.

A first slot 36 extends in a generally rearward direction from a rear section of the gap 34. The first slot 36 terminates in an aperture 38, having two rearwardly facing spaced apart abutment surfaces, an upper abutment surface 40 and a lower abutment surface 42, adjacent the first slot 36. The abutment surfaces 40 and 42 lie along a common imaginary line that is substantially perpendicular to the longitudinal axis of the cutting portion 14. The gap 34 together with the first slot 36 and the aperture 38 forms an insert retaining member pocket 43. A forwardly facing first location surface 44 is located at a rear section of the gap 34 adjacent the first slot 36 and is oriented substantially perpendicular to the longitudinal axis of the cutting portion 14.

Bordering the upper surface 31 of the tool clamping jaw 30 is a second slot 46 extending generally rearwardly from a gullet 47. The purpose of the second slot 46 is twofold. First, the second slot 46 provides flexibility to the tool clamping jaw 30 enabling it to be resiliently displaced for resilient clamping of the insert-retaining member 18. Second, it limits the extent to which the tool clamping jaw can be displaced, thereby ensuring that the tool clamping jaw cannot be displaced to beyond the elastic limit of the material of which it is made. The rearward linear extent, L1, of the second slot 46, measured from the gullet 47 in a rearward direction, is much less than the rearward linear extent, L2, of the insert retaining member pocket 43 (L1<<L2). Preferably, the rearward linear extent, L1, of the second slot 46, is less than the rearward linear extent, L3, of the gap 34 (L1<L3). The length of the second slot 46 has a bearing on the clamping strength of the cutting tool assembly 10. The longer the second slot 46, the weaker the cutting tool assembly. The length defined herein, insures the flexibility of the upper jaw 30 on the one hand, whilst retaining a relatively strong structure of the cutting tool assembly on the other hand. Clearly, the precise shape of the second slot 46 is a question of design optimization. As shown in the figures, the second slot 46 does not have to be straight. However, the second slot 46 preferably terminates in a stress relief hole 46'. It is clear that not only does the second slot 46 border the upper surface 31 of the tool clamping jaw 30, it actually defines the upper surface 31. However, If the second slot 46 deviates from extending in a generally rearward direction and at some point extends upwardly, then only that part of the second slot 46 that extends generally rearwardly will define the upper surface 31 of the tool clamping jaw 30.

It should be noted that the present invention is directed, in particular, to cutting tool assemblies having shallow gullets 47. A shallow gullet is one having a rearward linear extent much smaller than the rearward linear extent of the gap 34 between the tool base jaw 26 and the tool clamping jaw 30. Each cutting portion 14 of the cutting tool assembly 10 shown in the drawings has a shallow gullet 47. If the second slot 46 were removed, then the tool clamping jaw 30 would have negligible flexibility.

The insert retaining member 18 comprises a base jaw 48 and a clamping jaw 50 defining therebetween an insert pocket 52 for receiving the cutting insert 20. The insert pocket 52 is provided with an aperture 53 for receiving an insert-removing device. The aperture 53 extends from a rear section of the insert-receiving pocket in a generally rearward direction. The base jaw 48 has a lower side 54 constituting a first clamping abutment surface and an upper side 55 constituting a first insert abutment surface. The clamping jaw 50 has an upper side 56 constituting a second clamping abutment surface and a lower side 57. The lower side 57 is divided into three sections, an abutment section 57a, constituting a second insert abutment surface, a generally forward facing front section 57b and an intermediate section 57c, between the abutment section 57a and the front section 57b. The intermediate section 57c is generally rounded to facilitate the insertion of the cutting insert 20 into the insert pocket 52. The first and second clamping abutment surfaces 54, 56 taper towards the rear of the insert-retaining member 18 forming between them a taper angle $\alpha$. The taper angle $\alpha$ is, preferably, approximately 2°. The distance, h2, between the first and second clamping abutment surfaces 54, 56 taken approximately at the mid point of the second clamping abutment surface 56, is approximately equal to h1 (h2≈h1). The first and second insert abutment surfaces 55, 57a taper towards the forward end of the insert-retaining member.

The cutting insert 20 has an upper surface 19 and a lower surface 21. The upper surface 19 comprises two sections, a forward section 19a and rear section 19b. The forward section 19a meets the rear section 19b at a first junction 19'. The forward section 19a of the insert upper surface 19 and the lower surface 21 taper towards the forward end of the cutting insert 20 with a taper angle substantially equal to the taper angle between the first and second insert abutment surfaces 55, 57a of the insert retaining member 18. The rear section 19b, of the upper surface 19, and the lower surface 21 taper towards the rear end of the cutting insert 20. At the forward end of the cutting insert there is a protrusion, protruding in a generally upward direction, having a rearwardly facing surface 19c that is connected to the forward section 19a. The rearwardly facing surface 19c meets the forward section 19a at a second junction 19". The first junction 19' is at a height h3 from the lower surface 21 of the cutting insert 20, whereas the second junction 19" is at a height h4 from the lower surface 21. The height h3 is greater than the height h4.

The insert-retaining member 18 has an elongated portion 58 extending in a generally rearward direction. The elongated portion constituting a securing member. The dimensions of the elongated portion are such that it is capable of passing through the first slot 36 when mounting the insert-retaining member 18 in the gap 34. The insert-retaining member 18 is provided with a rearwardly facing second location surface 60 located to the rear of the lower jaw 48. When the insert-retaining member 18 is fully retained in the gap 34, the first location surface 44 abuts the second location surface 60 to ensure precise location of the insert-retaining member 18. The insert-retaining member is provided with an insert-locating surface 62 for precise location of the cutting insert with respect to the insert-retaining member. Consequently, with both the insert retaining member precisely located with respect to the tool body portion and the insert precisely located with respect to the retaining member, the cutting edge of the cutting insert is precisely located with respect to the tool body portion.

In order to assemble the cutting tool assembly 10, the cutting insert 20 is first inserted into the insert pocket 52 of the insert retaining member 18 until it abuts the insert locating surface 62. It should be noted that in accordance with the embodiment shown in the figures the forward facing front section 57b of the lower side surface 57 of the clamping jaw 50 does not abut the rearwardly facing surface 19c of the protrusion at the forward end of the cutting insert 20. It should further be noted that after insertion of the cutting insert 20 into the insert pocket 52, the taper angle α between the first and second clamping abutment surfaces 54, 56, is substantially the same as it was before the insertion of the cutting insert 20. Following this, the insert retaining member 18, with the cutting insert 20 retained in the insert pocket 52, is inserted in the insert retaining member pocket 43. Due to the tapering of the first and second clamping abutment surfaces 54, 56, when the insert-retaining member 18 is mounted in the gap 34 and urged towards the rear of the gap, it will, at first, slide in without resistance. In order to complete the mounting of the insert-retaining member, so that it is fully retained in the gap, force has to be applied to the insert-retaining member. As the insert-retaining member 18 is urged rearwardly into the gap 34 the tool clamping jaw 30 of the tool clamping portion 16 is displaced upwardly, that is away from the tool base jaw 26 of the tool clamping portion 16. Consequently, the width of the second slot 46 decreases until, with the insert retaining member fully inserted in the gap 34, it reaches its final width h, which will be referred to as its retaining width. The retaining width h of the second slot 46 is sufficiently smaller than the vertical distance H (=h3−h4) between the first junction 19' and the second junction 19" to ensure that the cutting insert 20 cannot exit the insert pocket 52. With the insert retaining member 18 fully retained in the gap 34, the first and second clamping surfaces 28, 32 have a taper angle between them equal to the taper angle α between the first and second clamping abutment surfaces 54, 56.

Figure 3:
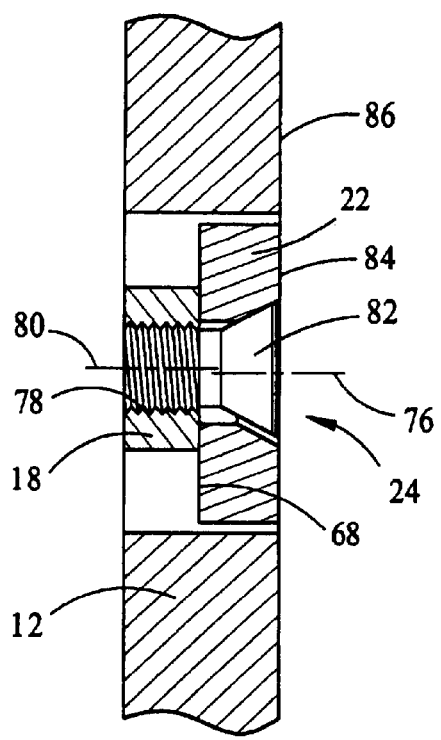
FIG. 3 is a partial cross sectional view of the cutting portion of FIG. 2 taken along the line III—III.

In addition to FIGS. 1 and 2, attention is now also drawn to FIG. 3. The securing member 22 is of a general trapezoidal shape, having a forward face 64 and a rear face 66, and is received in a recessed region 68 in the elongated portion 58 of the insert retaining member 18. The recessed region 68 has a forward face 70, a rear face 72, and has a shape generally similar to that of the securing member 22. The rear face 72 constitutes a forwardly facing abutment surface. The securing member is provided with a countersunk through bore 74 having a first longitudinal axis 76, and the recessed region 68 is provided with a screw threaded bore 78 having a second longitudinal axis 80.

When the retaining member is fully retained in the gap 34 and the securing member 22 is positioned in the recessed region 68, the first and second longitudinal axes 76, 80 are relatively displaced with respect to each other, in a manner such that when the countersunk head screw 24 is placed in the countersunk through bore 74 and is screwed into the screw threaded bore 78, the forward face 64, of the securing member 22, abuts the two rearwardly facing spaced apart abutment surfaces 40 and 42, and the rear face 66, of the securing member, abuts the rear face 72 of the recessed region 68 in the insert retaining member. The forward face 64, of the securing member 22, does not abut the forward face 70 of the recessed region 68. This creates a three-point contact arrangement between the securing member 22, the insert-retaining member 18 and the tool body portion 12. As the countersunk head screw 24 is tightened its conical head 82 abuts an upper portion of the matching countersunk through bore 74 of the securing member 22, and the securing member is forced to move in an upward direction as the first longitudinal axis 76 moves towards the second longitudinal axis 80. Due to the three-point contact arrangement and the trapezoidal shape of the securing member, the more the countersunk head screw 24 is tightened, the greater the securing force applied by the securing member on the insert retaining member via the rear face 66 of the securing member as it abuts the rear face 72 of the recessed region 68. As seen in FIG. 3, the thickness of the securing member 22 is such that, when it is secured in position, its outwardly facing surface 84 is substantially flush with a side surface 86 of the tool body portion 12.

With the cutting insert 20 retained in the insert pocket 52 and the insert retaining member 18 securely retained in the insert retaining member pocket 43, the cutting insert cannot be dislodged from the insert pocket 52. If an external force applied to the cutting insert 20 manages to urge it in a forward direction, then the clamping jaw 50 of the insert retaining member 18 will be urged in an upward direction, which in turn will urge the tool clamping jaw 30 of the tool clamping portion 16 in an upward direction thereby decreasing the width of the second slot 46. If the external force is great enough, the width of the second slot 46 could be reduced to close to zero. However, since the retaining width h of the second slot 46 is less that the vertical distance H between the first junction 19' and the second junction 19", the cutting insert 20 would not be able to exit the insert pocket 52 since the first junction 19' would not be able to pass the intermediate section 57c of the lower side 57 of the clamping jaw 50.

Figure 4:
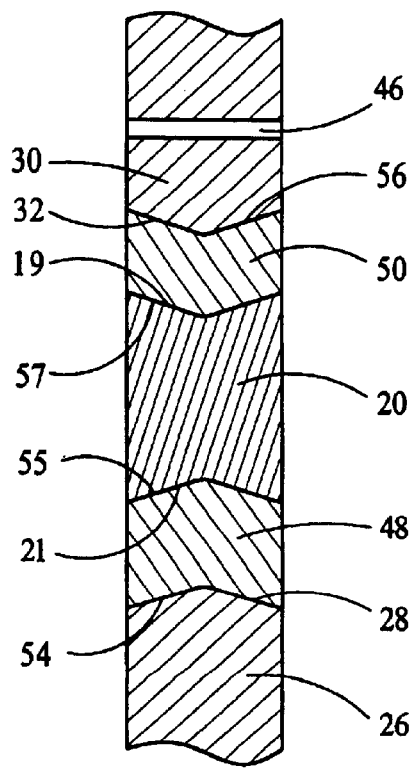
FIG. 4 is a partial cross sectional view of the cutting portion of FIG. 2 taken along the line IV—IV.

Attention is now drawn to FIG. 4, showing the mechanism for preventing lateral movement of the insert retaining member 18 with respect to the tool clamping portion 16 of the tool body portion 12. In accordance with a preferred embodiment of the present invention, the first and second clamping surfaces 28 and 32, respectively, of the tool base jaw 26 and tool clamping jaw 30, respectively, have convex V-shaped cross-sections, and the first and second clamping abutment surfaces 54, 56, respectively, of the base jaw 48 and clamping jaw 50, of the insert retaining member 18, have mating concave V-shaped cross-sectional surfaces. As is well known in the art (see, for example, U.S. Pat. Nos. 4,580,930 and 4,887,945) lateral stability of a cutting insert can be achieved in a similar way. The first and second insert abutment surfaces 55, 57, respectively, of the base jaw 48 and clamping jaw 50, have convex V-shaped cross-sections, and the lower and upper surfaces 21, 19, respectively, of the cutting insert 20 have mating concave V-shaped cross-sectional surfaces (shown by broken lines in FIG. 1).

Figure 5:
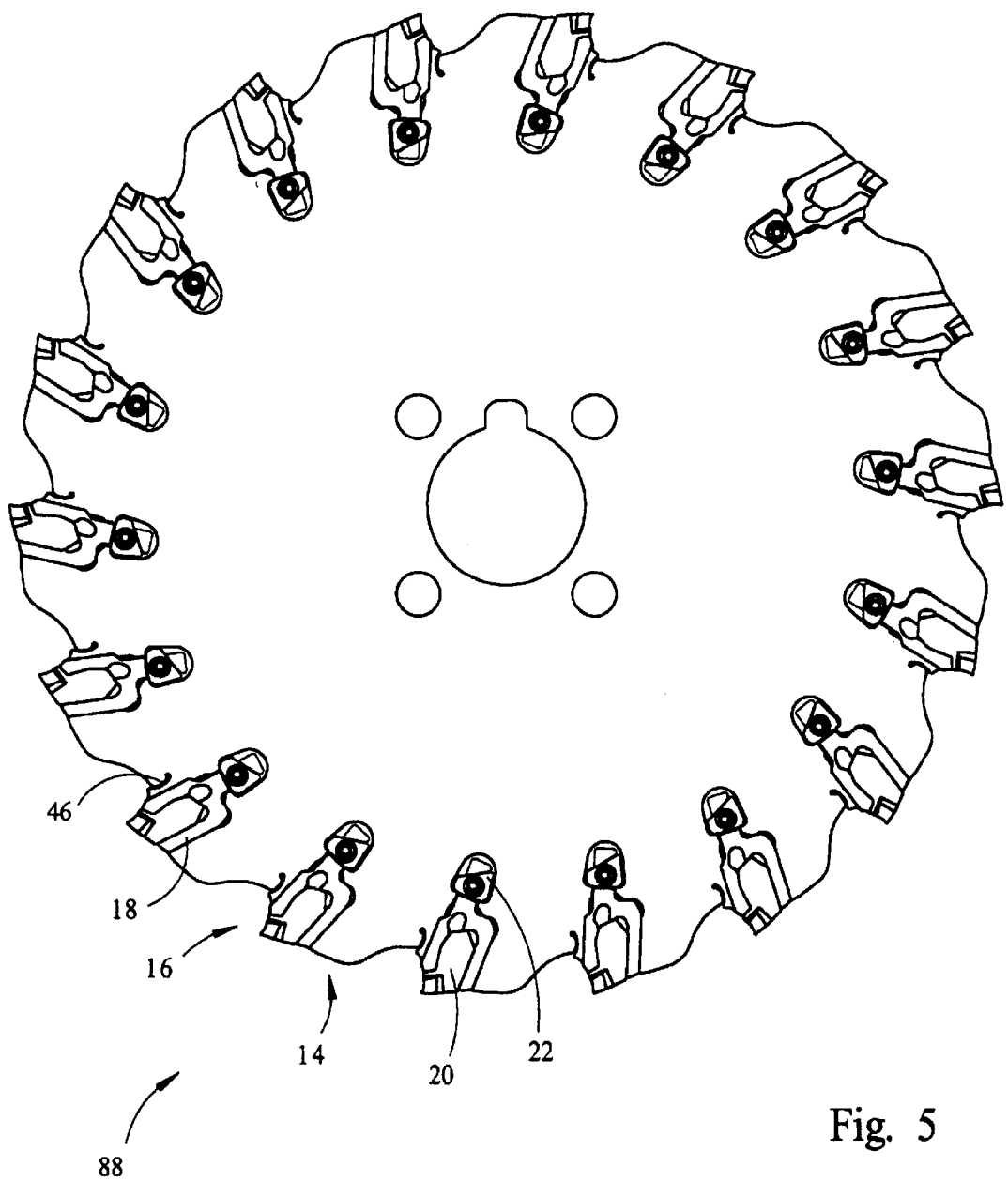
FIG. 5 is a side view of a rotary cutting tool having a cutting portion in accordance with the present invention.

FIG. 5 shows a rotary slot-cutting tool 88 with a plurality of cutting portions 14, arranged around the periphery of the tool, each cutting portion comprising a tool clamping portion 16, an insert retaining member 18, a cutting insert 20 and a securing member 22 in accordance with the present invention.

It is pointed out that U.S. Pat. No. 5,524,518 discloses a saw blade having features that, prima facie, seem to have some features that are similar to features disclosed in the present invention. However, there are a number of fundamental differences that should be noted. First and foremost, the '518 patent does not disclose a cutting tool assembly in which the cutting insert is mounted in an insert retaining member. Instead, the cutting insert is retained directly in a recess in the saw blade. Furthermore, the slots (e.g., 23 and 24 in FIG. 2 of the '518 patent) are substantially deeper than the recess. Still furthermore, the saw blade of the '518 patent requires a tension distributing hole, radially inwards of each hole. Finally, it is noted that the arrangement of the slots and tension distributing hole of the '518 patent offer no support against the cutting inserts (named "tips" the '518 patent) being dislodged and of being thrown out of the recesses by centrifugal forces in high speed cutting. In fact, it is quite clearly stated in the '518 patent that "In sawing of metal, the cutting speed is limited and there is little risk of the tips being thrown out of the recesses by centrifugal forces . . . ". Whereas for higher cutting speeds some form of securing of the tips is required: ". . . but in sawing of wood with much higher cutting speed, it is suitable to secure the tips with pins or tubular pegs . . . ".

Although the present invention has been described to a certain degree of particularity, it should be understood that various alterations and modifications can be made without departing from the spirit or scope of the invention as hereinafter claimed.

What is claimed is:

1. A cutting tool assembly, comprising a tool body portion and at least one cutting portion at a forward portion of the cutting tool assembly, the at least one cutting portion comprising a tool clamping portion, an insert retaining member and a cutting insert;

the tool clamping portion comprising:
  a tool base jaw having an upper side constituting a first clamping surface;
  a tool clamping jaw having an upper side and a lower side, the lower side constituting a second clamping surface, the tool base jaw and the tool clamping jaw having a gap therebetween for resiliently receiving the insert retaining member, the gap having a given rearward linear extent (L3);
  a first slot extending in a generally rearward direction from a rear section of the gap, the first slot terminating in an aperture, the gap together with the first slot and the aperture forming an insert retaining member pocket having a given rearward linear extent (L2);
  a forwardly facing first location surface; and
  a second slot extending generally rearwardly from a gullet bordering the upper side of the tool clamping jaw, the second slot having a given rearward linear extent (L1);

the insert retaining member comprising:
  a base jaw having a lower side constituting a first clamping abutment surface for abutting the first clamping surface, and a clamping jaw having an upper side constituting a second clamping abutment surface for abutting the second clamping surface, the base jaw and the clamping jaw defining therebetween an insert pocket for receiving the cutting insert; and
  a rearwardly facing second location surface wherein, when the cutting tool assembly is assembled, the second location surface of the insert retaining member abuts the first location surface thereby precisely locating the insert locating member in the gap.

2. The cutting tool assembly according to claim 1, wherein the rearward linear extent (L1) of the second slot is much less than the rearward linear extent (L2) of the insert retaining member pocket (L1<<L2).

3. The cutting tool assembly according to claim 1, wherein the rearward linear extent (L1) of the second slot, is less than the rearward linear extent (L3) of the gap (L1<L3).

4. The cutting tool assembly according to claim 1, wherein the first location surface is located at a rear section of the gap adjacent the first slot and oriented substantially perpendicular to the first and second clamping surfaces.

5. The cutting tool assembly according to claim 4, wherein the second location surface is located to the rear of the base jaw of the insert retaining member.

6. The cutting tool assembly according to claim 5, wherein the insert retaining portion further comprises a securing portion to which a securing member can be removably attached for securing the insert retaining member in position in the gap between the tool clamping jaw and the tool base jaw of the tool clamping portion.

7. The cutting tool assembly according to claim 6, wherein the securing portion is an elongated portion of the insert retaining member extending in a generally rearward direction and capable of passing through the first slot.

8. The cutting tool assembly according to claim 7, wherein the securing member is of a general trapezoidal shape, having a forward face and a rear face, and wherein when the insert retaining member is retained in the gap in the tool clamping portion, the securing member is received in a recessed region in the elongated portion of the insert retaining member, the recessed region having a shape generally similar to that of the securing member, the aperture has two rearwardly facing spaced apart abutment surfaces adjacent the first slot and the elongated portion of the insert retaining member has a forwardly facing rear abutment surface, the securing member being provided with a countersunk through bore with a first longitudinal axis and the recessed region being provided with a screw threaded bore having a second longitudinal axis, the first and second longitudinal axes being relatively displaced one with respect to the other in a manner so that when a countersunk head screw is placed in the countersunk through bore and is screwed into the screw threaded bore the forward face of the securing member abuts the two rearwardly facing spaced apart abutment surfaces and the rear face of the securing member abuts the forwardly facing rear abutment surface of the elongated portion, thereby ensuring that precise location of the insert retaining member is maintained.

9. The cutting tool assembly according to claim 1, wherein the upper side of the tool base jaw of the tool clamping portion is substantially parallel to the lower side of the tool clamping jaw of the tool clamping portion.

10. The cutting tool assembly according to claim 9, wherein the first and second clamping abutment surfaces taper towards the rear of the insert retaining member forming therebetween a taper angle ($\alpha$).

11. The cutting tool assembly according to claim 10, wherein the taper angle ($\alpha$) is approximately 2°.

12. The cutting tool assembly according to claim 1, wherein the base jaw and the clamping jaw of the insert retaining member have, respectively, first and second insert abutment surfaces that taper towards a forward end of the insert retaining member at a given taper angle, and the cutting insert has an upper surface and a lower surface, the upper surface comprising two sections, a forward section and rear section, the forward section of the insert upper surface and the lower surface taper towards a forward end of the cutting insert with a taper angle substantially equal to the taper angle between the first and second insert abutment surfaces of the insert retaining member.

13. The cutting tool assembly according to claim 12, wherein the rear section, of the upper surface, and the lower surface taper towards a rear end of the cutting insert.

14. The cutting tool assembly according to claim 1, wherein the insert pocket is provided with an aperture extending from a rear section of the insert pocket in a generally rearward direction.

15. The cutting tool assembly according to claim 1, wherein the cutting tool is a rotary slot cutting tool and the rearward linear extent of the gullet is much less than the rearward linear extent of the insert retaining member pocket.

16. A cutting tool assembly, comprising a tool body portion and at least one cutting portion at a forward portion of the cutting tool assembly, the at least one cutting portion comprising a tool clamping portion and an insert retaining member;

the tool clamping portion comprising:
- a tool base jaw having an upper side constituting a first clamping surface;
- a tool clamping jaw having an upper side and a lower side, the lower side constituting a second clamping surface, the tool base jaw and the tool clamping jaw having a gap therebetween for resiliently receiving the insert retaining member, the gap having a given rearward linear extent (L3);
- a first slot extending in a generally rearward direction from a rear section of the gap, the first slot terminating in an aperture, the gap together with the first slot and the aperture forming an insert retaining member pocket having a given rearward linear extent (L2);
- a forwardly facing first location surface; and
- a second slot extending generally rearwardly from a gullet bordering the upper side of the tool clamping jaw, the second slot having a given rearward linear extent (L1);

the insert retaining member comprising:
- a base jaw having a lower side constituting a first clamping abutment surface for abutting the first clamping surface, and a clamping jaw having an upper side constituting a second clamping abutment surface for abutting the second clamping surface, the base jaw and the clamping jaw defining therebetween an insert pocket for receiving a cutting insert; and
- a rearwardly facing second location surface wherein, when the cutting tool assembly is assembled, the second location surface of the insert retaining member abuts the first location surface thereby precisely locating the insert locating member in the gap.

17. The cutting tool assembly according to claim 16, further comprising a cutting insert retained in the insert pocket defined between the base jaw and the clamping jaw of the insert retaining menber.

* * * * *